US006833116B2

(12) United States Patent
D'Herde et al.

(10) Patent No.: US 6,833,116 B2
(45) Date of Patent: Dec. 21, 2004

(54) VARIABLE FLOW REGULATOR FOR USE WITH GAS TREATMENT DEVICES

(75) Inventors: Eric J. D'Herde, Grand Blanc, MI (US); Carlos Gutierrez, Grand Blanc, MI (US); Stephen J. Myers, Owosso, MI (US); Paul E. Jankowski, Goodrich, MI (US)

(73) Assignee: Delphi Technologies, Inc., Troy, MI (US)

( * ) Notice: Subject to any disclaimer, the term of this patent is extended or adjusted under 35 U.S.C. 154(b) by 718 days.

(21) Appl. No.: 09/883,728

(22) Filed: Jun. 18, 2001

(65) Prior Publication Data

US 2002/0073698 A1 Jun. 20, 2002

Related U.S. Application Data (63) Continuation-in-part of application No. 09/737,844, filed on Dec. 15, 2000.

(51) Int. Cl.[7] .............................. B01D 53/34; F01N 3/28
(52) U.S. Cl. ........................ 422/176; 422/177; 422/179; 422/180
(58) Field of Search ................................. 422/171, 176, 422/177, 179, 180; 423/210, 212; 60/274, 299

(56) References Cited

U.S. PATENT DOCUMENTS

| 5,666,805 A | * | 9/1997 | Bloedel-Pawlik et al. ..... 60/299 |
| 5,914,294 A | | 6/1999 | Park et al. ................... 502/417 |
| 6,075,298 A | | 6/2000 | Maue et al. ................... 310/12 |
| 6,101,889 A | | 8/2000 | Laskey ...................... 74/89.15 |
| 6,107,759 A | | 8/2000 | Miller ........................... 318/4 |

FOREIGN PATENT DOCUMENTS

| WO | WO 96/33891 | 10/1996 |

* cited by examiner

*Primary Examiner*—Hien Tran
(74) *Attorney, Agent, or Firm*—Jimmy L. Funke (57) ABSTRACT

A gas treatment system comprises a variable flow regulator assembly placed in operable and fluid communication with a shell of a gas treatment device. The variable flow regulator assembly comprises two or more conduit portions comprising a first portion and a second portion, wherein the second portion has a coefficient of thermal expansion greater than a first coefficient of thermal expansion of the first portion. The variable flow regulator assembly structurally changes shape to alter the flow maldistribution of an exhaust gas stream into the gas treatment device when light off is achieved.

28 Claims, 8 Drawing Sheets

VARIABLE FLOW REGULATOR FOR USE WITH GAS TREATMENT DEVICES

CROSS-REFERENCE TO RELATED APPLICATIONS

This is a continuation-in-part application of U.S. patent application Ser. No. 09/737,844 filed on Dec. 15, 2000.

TECHNICAL FIELD

The disclosure relates to gas treatment devices and, more particularly, to an apparatus and method for improving gas treatment device performance.

BACKGROUND

The reduction of emissions from vehicle exhaust systems is a well known problem. As the number of vehicles having an internal combustion engine continues to increase, the problem is becoming more severe and despite the introduction of gas treatment device exhaust systems, the exhaust emissions from vehicles fitted with such systems are still relatively high.

In particular exhaust emissions are relatively high during the initial start up or warm-up phase, also referred to as the "cold start", of an internal combustion engine after starting, especially with regard to the emissions of carbon monoxide, oxides of nitrogen and hydrocarbons. Start up conditions refer to when the gas treatment device is not operating. For example, this could be on a cold winter day when the temperature is −10° C. or on a summer day when the ambient temperature is 30° C. The gas treatment device must be heated to approximately 250° C. before it becomes operable to convert the combustion by-products of the internal combustion engine. Normal operating temperature is in the 400° C. to 800° C. range. For the internal combustion engine to meet the Federal Test Procedure for the new stringent exhaust requirements, the catalyst must come up to temperature as quickly as possible.

The particularly high exhaust emissions are largely due to the fact that the gas treatment device has not reached its so-called "light-off" temperature, at which the catalyst causes the required catalytic reactions to take place. The light-off temperature can be defined as the temperature at which the gas treatment device reaches 50% conversion. Modem catalyst systems start operating at temperatures of around 200° C. to 300° C.

In order to reduce the quantity of harmful emissions during the initial warm-up phase, a plurality of different solutions has been proposed, many of these solutions being based on shortening the time taken to reach the light-off temperature by raising the temperature in the catalyst as fast as possible. During start up, this can be achieved by generating increased heat energy into the exhaust system, which subsequently causes the catalyst to be rapidly heated.

A previously known arrangement for obtaining this reduction in time for the light-off temperature to be reached is one comprising an electrically heated catalyst, which is arranged upstream from the main catalyst. However, this arrangement implies certain drawbacks. Firstly, the cost for a heatable substrate is considerable. Furthermore, the consumption of electrical energy is relatively high. An additional power supply such as an extra battery may be required in the vehicle. Also, the durability of the electrically heatable substrate may constitute a problem.

SUMMARY

A gas treatment device comprises a substrate, a shell concentrically disposed around the substrate, and a mat support material disposed between the substrate and shell. A variable flow regulator assembly is in fluid communication with the substrate. The variable flow regulator assembly comprises a second portion having a coefficient of thermal expansion greater than a first portion coefficient of thermal expansion. The second portion is disposed between a first portion and the substrate.

A method for using a gas treatment device in a gas treatment system comprises introducing a gas into the gas treatment device. The gas treatment device comprises a shell concentrically disposed around a substrate, a mat support material disposed between the substrate and shell, and a variable flow regulator assembly in fluid communication with the substrate. The variable flow regulator assembly comprises a second portion having a coefficient of thermal expansion greater than a first portion coefficient of thermal expansion, and the second portion is disposed between a first portion and the substrate. The gas passes through the variable flow regulator assembly. The flow distribution of the gas is changed to the substrate.

A gas treatment device comprises a means for containing a substrate, with a means for supporting the substrate disposed therebetween; a means for controlling fluid flow distribution to the substrate comprising a variable flow regulator assembly comprising a second portion having a coefficient of thermal expansion greater than a first portion coefficient of thermal expansion, wherein the second portion is disposed between a first portion and the substrate; and a means for connecting the means for containing to a fluid supply, wherein the means for connecting is in operable communication with the means for controlling fluid flow distribution.

A catalytic converter comprises a shell concentrically disposed around a substrate comprising a catalyst, and a mat support material disposed between the substrate and shell. A variable flow regulator assembly is placed in fluid communication with the substrate. The variable flow regulator assembly comprises a second portion having a coefficient of thermal expansion greater than a first portion coefficient of thermal expansion. The second portion is disposed between a first portion and the substrate. A portion of at least the first portion is disposed around and fixedly attached to at least a section of the second portion. An end cone disposed concentrically around the variable flow regulator assembly is in operable communication with the shell, and in fluid communication with the variable flow regulator assembly.

The above described and other features are exemplified by the following figures and detailed description.

BRIEF DESCRIPTION OF THE DRAWINGS

Referring now to the figures wherein the like elements are numbered alike.

DESCRIPTION OF THE PREFERRED EMBODIMENT

Under start up conditions, maldistribution, that is an unsatisfactory distribution of exhaust elements, is high and the thermal content of the exhaust gas stream is focused upon a small thermal mass. The maldistribution can preferably be variably controlled using a variable flow regulator so that the initial high maldistribution is concentrated directly into the substrate. As a result the environmentally unfriendly elements of the exhaust gas are catalyzed more efficiently, and the gas treatment device reaches light-off more quickly.

The gas treatment device can comprise any device employed in catalytically treating environmentally unfriendly gas elements. Such devices comprise catalytic converters, evaporative emissions treatment devices, hydrocarbon scrubbing devices, photocatalytic treatment device, diesel particulate traps, non-thermal plasma reactors, as well as combinations comprising at least one of the foregoing devices, and the like. One or more of the above-mentioned gas treatment devices, as well as other gas treatment devices, can be disposed in operable and fluid communication with an engine of a mobile vehicle. At times as the gas treatment device works to achieve light-off, a back pressure builds in the engine combustion chamber. When the gas treatment device achieves light-off, the back pressure is suddenly reduced, and often times, to quickly for the engine to adjust the fuel to oxygen ratio, which correspondingly reduces the engine's performance i.e., reduced horsepower. The variable flow regulator prevents the typical pressure drop and improves the engine's overall performance.

A gas treatment device having a variable flow regulator comprises a substrate comprising a catalyst. The substrate is disposed concentrically within a shell having an opening, and a mat support material is disposed concentrically between the substrate and shell, and around the substrate. The variable flow regulator is disposed within the opening at one end and secured within the shell and an endcone assembly, exhaust manifold cover, exhaust pipe, connecting pipe, or other exhaust system component, and the like. The shell is fitted to an end cone assembly, end plate, and the like, at the opposite end. The exhaust system component housing the variable flow regulator is attached to another exhaust system component such as an exhaust pipe, a coupling apparatus, a connecting pipe, an exhaust manifold assembly, combinations comprising at least one of the foregoing, and the like.

A variable flow regulator assembly comprises a first stationary exhaust pipe having one or more interference tabs circumferentially fitted about its interior surface, a second stationary exhaust pipe concentrically disposed within the first stationary exhaust pipe, and a movable exhaust pipe concentrically disposed between the exterior and interior exhaust pipes, and having one or more interference tabs concentrically and circumferentially fitted about its exterior surface. The movable exhaust pipe telescopically extends and retracts from a first position to a second position, and to a third position, or back to a first position, along the length of the second stationary exhaust pipe, and between the first and second stationary exhaust pipes, so that the exhaust gas flow can be variably controlled. The interference tabs of the first and movable exhaust pipes interact to restrict the movement of the movable exhaust pipe Another variable flow regulator assembly comprises a first stationary exhaust pipe, a second stationary exhaust pipe concentrically disposed within the first stationary exhaust pipe, and a movable exhaust pipe concentrically disposed between the first and second stationary exhaust pipes. In this particular embodiment, the movable exhaust pipe rotates about the second stationary exhaust pipe to variably control the flow maldistribution of environmentally unfriendly exhaust gas elements into the gas treatment device. Both the movable exhaust pipe and second stationary exhaust pipe include a plurality of concentrical and circumferential slots disposed about an end or outlet of both the second and movable exhaust pipes. As the movable exhaust pipe rotates about the second stationary exhaust pipe from a first position to a second position, and to a third position, or back to a first position, both sets of slots interact to variably control the flow of the exhaust gas stream upon entering the gas treatment device. The first stationary exhaust pipe includes one or more interference tabs circumferentially and concentrically fitted about its interior surface. The movable exhaust pipe also includes one or more interference tabs circumferentially and concentrically fitted about its exterior surface. The interference tabs of the first and movable exhaust pipes engage and interact to restrict the rotational movement of the variable flow regulator.

Yet another variable flow regulator assembly comprises a second conduit portion having a coefficient of thermal expansion greater than a first conduit portion coefficient of thermal expansion. A portion of the first conduit portion is concentrically disposed around at least a section of the second portion. The second conduit portion is disposed between the first conduit portion and a substrate of a gas treatment device.

A gas treatment device 10 comprises one or more substrates 12. The substrate 12 can comprise any material designed for use in a spark ignition or diesel engine environment, and have the following characteristics: (1) capable of operating at temperatures up to about 1,000° C., (2) capable of withstanding exposure to hydrocarbons, nitrogen oxides, carbon monoxide, carbon dioxide, and/or sulfur; and (3) have sufficient surface area and structural integrity to support the desired catalyst. Some possible materials include cordierite, silicon carbide, metallic foils, alumina sponges, porous glasses, and the like, and mixtures comprising at least one of the foregoing. Some ceramic materials include "HONEY CERAM", commercially available from NGKDP-Locke, Inc, Southfield, Mich., and "CELCOR", commercially available from Corning, Inc., Corning, N.Y.

The substrate can also comprise an activated carbon element such as that described in U.S. Pat. No. 5,914,294 to Park et al., which is incorporated by referenced herein.

Although the substrate 12 can have any size or geometry, the size and geometry are preferably chosen to optimize the surface area in the given gas treatment device design parameters. Typically, the substrate 12 has a honeycomb geometry, with the combs being any multi-sided or rounded shape, with substantially square, hexagonal, octagonal or similar geometries preferred due to ease of manufacturing and increased surface area.

Disposed on and/or throughout the substrate 12 is a catalyst for controlling emissions levels. The catalyst may comprise one or more catalyst materials that are wash coated, imbibed, impregnated, physisorbed, chemisorbed, precipitated, or otherwise applied to the substrate. Possible catalyst materials include noble metals, such as platinum, palladium, rhodium, iridium, osmium, and ruthenium; other metals, such as tantalum, zirconium, yttrium, cerium, nickel, copper, and the like; active carbon, titanium dioxide ($TiO_2$) and the like; as well as metal oxides; alloys; and mixtures comprising of at least one of the foregoing catalysts, and the like. The catalyst can optionally include a base metal oxide for the reduction of nitrogen oxides.

Located in between the substrate 12 and a gas treatment device shell 16 is a mat support material 14 that insulates the shell 16 from both high exhaust gas temperatures and the exothermic catalytic reaction occurring within the substrate 12. The mat support material 14, which enhances the structural integrity of the substrate 12 by applying compressive radial forces about it, reducing its axial movement, and retaining it in place, is concentrically disposed around the substrate 12 to form a mat support material/substrate subassembly. The mat support material 14 can either be a simple non-intumescent material, or an intumescent material, e.g., one which contains a vermiculite component that expands with heating to maintain firm uniform compression when the shell expands outward from the substrate, as well as materials which include a combination of both. Typical non-intumescent materials include ceramic materials, and other conventional materials such as an organic binder and the like, or combinations comprising at least one of the foregoing, such as those sold under the trademarks "NEXTEL" and "SAFFIL" by the "3M" Company, Minneapolis, Minn., or those sold under the trademark, "FIBERFRAX" and "CC-MAX" by the Unifrax Co., Niagara Falls, N.Y., and the like. Intumescent materials, which include ceramic materials, vermiculite, or combinations comprising at least one of the foregoing, may include other conventional materials such as organic binders and the like. Examples of intumescent materials include those sold under the trademark "INTERAM" by the "3M" Company, Minneapolis, Minn., as well as those intumescents which are also sold under the aforementioned "FIBERFRAX" trademark, as well as combinations thereof and others.

The mat support material/substrate subassembly is concentrically disposed within the shell 16. The shell 16 includes at least one opening 18 for receiving the mat support material/substrate subassembly. The choice of material for the shell 16 depends upon the type of exhaust gas, the maximum temperature reached by the substrate 12, the maximum temperature of the exhaust gas stream, and the like. Suitable materials for the shell 16 can comprise any material that is capable of resisting under-car salt, temperature and corrosion. Typically, ferrous material, and the like, is employed such as ferritic stainless steels. Some ferritic stainless steels include grades from the 400-Series such as SS-409, SS-439, and SS-441, with grade SS-409 generally preferred. More specifically, SS-409 possesses a thermal coefficient of expansion of about $17.3 \times 10^{-6}/°$ C. Based upon a $\Delta T$ of about 370° C., the SS-409 stainless steel composition expands about 0.006 mm. When utilized for the exhaust pipes in the present application, the circumference of an SS-409 exhaust pipe, having a diameter of approximately 0.75 mm, expands approximately 1.5 mm, which will not interfere with the movement of the variable flow regulator or the interaction of the interference tabs.

Figures 1, 2:
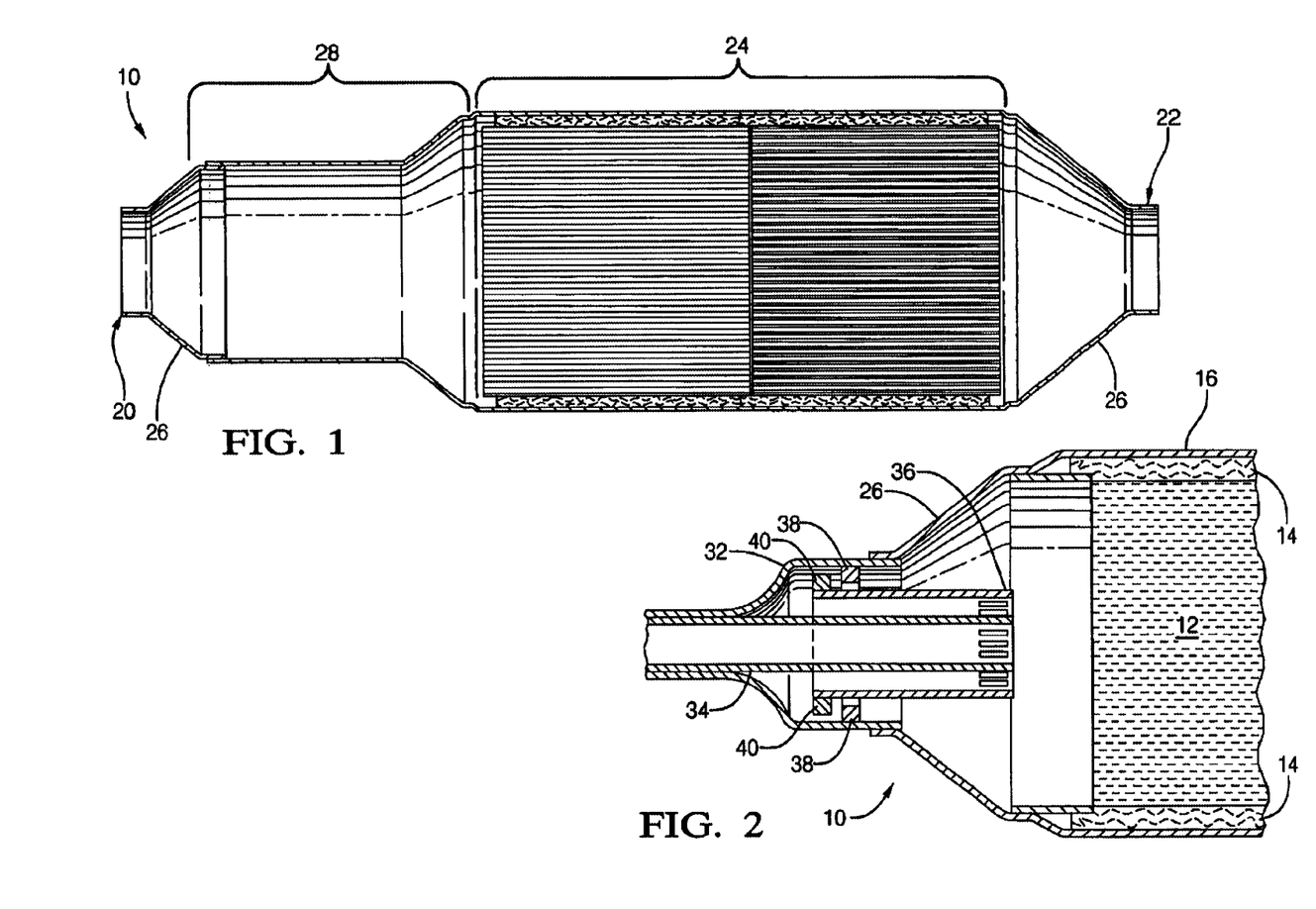
FIG. 1 is an exemplary embodiment of a gas treatment device.
FIG. 2 is a cross-sectional view of the gas treatment device of FIG. 1 having an exemplary embodiment of a variable flow regulator.

FIG. 1 illustrates an exemplary embodiment of the shell 16 of the instant application. The shell 16 can comprise an exhaust inlet 20, a second end 22, and a containment area 24. An outer end cone 26 can be fitted to at least one end 20 or 22. Containment area 24 can be sized, such as, e.g. using a draw ring or other conventional means, and reduced in diameter to form a narrow cylindrical area 28 near the first end 20, where the variable flow regulator assembly can be mounted. One or more substrates 12 can preferably be disposed within the containment area 24, and near the cylindrical area 28, so that the variable flow regulator assembly can direct the exhaust gas stream into the center of the substrate 12.

Typically, the mat support material/substrate subassembly can be inserted into the shell 16 using a variety of methods. In the instant application, the subassembly can be placed in a stuffing cone, for example. The stuffing cone is a device that compresses the mat support material 14 concentrically about the substrate 12 using a ramming component. The ramming component stuffs the compressed mat support material/substrate subassembly into the shell 16 without peeling the mat support material 14 away from the substrate 12. The shell 16 can be compressively closed upon the mat support material/substrate subassembly by exerting a substantially uniform compressive stress, and complete the assembly of the gas treatment device 10.

In the alternative, a compressive sizing operation can be employed when the mat support material/substrate subassembly is disposed concentrically within the shell 16. The shell 16 can be compressively sized to achieve the desired mat pressure of the mat support material 14 to be exerted upon the substrate 12. Once the mat support material/substrate subassembly is disposed within the shell 16, an outer endcone 26 configured to receive a variable flow regulator can be attached to the shell 16 at opening 18 to provide a gas tight seal. The outer endcone 26 and variable flow regulator can attach to an exhaust system component such as an exhaust pipe, a connecting pipe, an exhaust manifold assembly, a coupling apparatus, combinations comprising at least one of the foregoing, other exhaust system components, and the like.

Optionally, a mat protection device 104 can be disposed concentrically about the substrate, and interact with the mat support material. More particularly, the mat protection device can be make contact with or penetrate the leading edge of the mat support material a distance of up to about 6 millimeters, and preferably about 4 millimeters, and most preferably about 3 millimeters. The mat protection can comprise a mat protection ring, a retainer ring, an end ring, as well as combinations comprising at least of the foregoing devices, and the like. The mat protection device can be attached to the shell and/or an exhaust system component disposed in fluid communication with the shell FIGS. 2–5 depict an exemplary embodiment of a gas treatment device 10 fitted with an exemplary embodiment of the variable flow regulator assembly. A first exemplary embodiment of a variable flow regulator assembly comprises a first stationary exhaust pipe 32, a second stationary exhaust pipe 34 concentrically disposed within the first stationary exhaust pipe 32, and a movable exhaust pipe 36 concentrically disposed between the first and second stationary exhaust pipes 32, 34. One or more interference tabs 38 are concentrically and circumferentially fitted about the interior surface of the first stationary exhaust pipe 32. In addition, one or more interference tabs 40 are concentrically and circumferentially fitted about the exterior surface of the movable exhaust pipe 36.

The interference tabs 38 of the first stationary exhaust pipe 32 preferably compliment the interference tabs 40 of the movable exhaust pipe 36. The interference tabs include a structural feature such as a joint configuration, tongue and groove, or one or more members that overlap, snap, engage, or interlock, or a device such as a magnetic or electronic locking mechanism for holding interference tabs 38 and 40 in a complimentary engagement. Under start up conditions, the movable exhaust pipe 36 is preferably positioned at a resting position, such as, e.g., resting position A (See FIG. 3). At resting position A the movable exhaust pipe 36 is fully extended such that an outlet 37 of the movable exhaust pipe 36 can abut the substrate 12 or be placed a distance "d" from the substrate 12, and the interference tabs 38, 40 are engaged. By minimizing the distance between the intake area of the substrate 12 and the movable exhaust pipe 36, the high maldistribution can rapidly feed directly into the substrate 12. The substrate 12 can immediately begin catalyzing the exhaust elements, which causes the temperature of the substrate 12 to quickly rise from its initial start up temperature.

Figure 3:
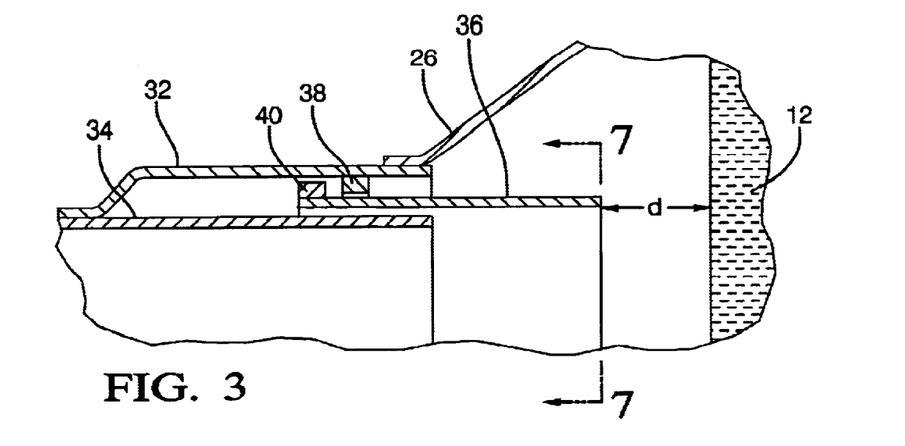
FIG. 3 is an enlarged partial cross-sectional view of the gas treatment device and variable flow regulator of FIG. 2 at a first position.
Figure 4:
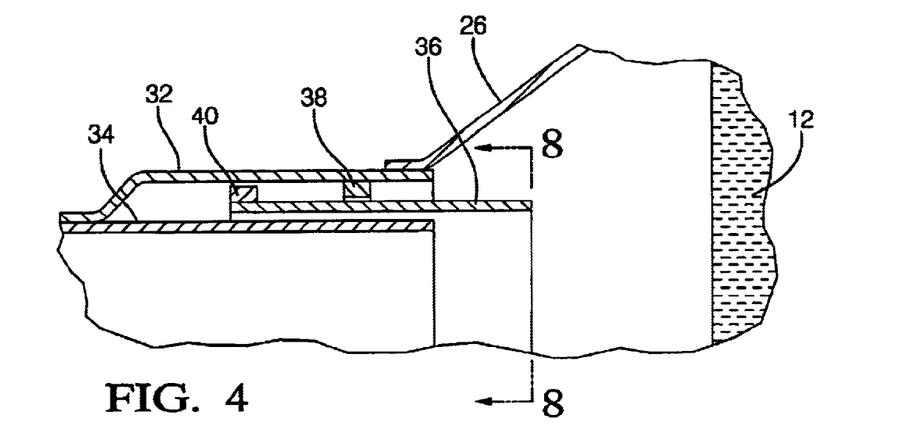
FIG. 4 is an enlarged partial cross-sectional view of the gas treatment device and variable flow regulator of FIG. 2 at a second position.
Figure 5:
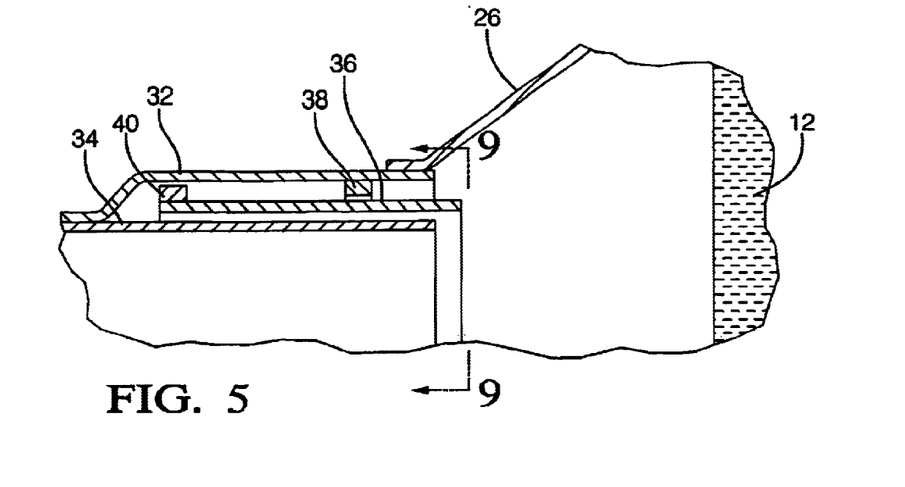
FIG. 5 is an enlarged partial cross-sectional view of the gas treatment device and variable flow regulator of FIG. 2 at a third position.
Figure 6:
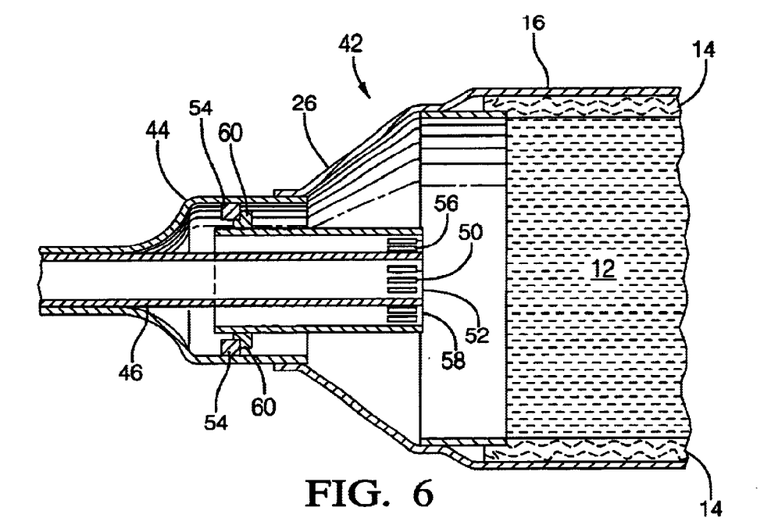
FIG. 6 is a cross-sectional view of an exemplary embodiment of a gas treatment device having another exemplary embodiment of a variable flow regulator.
Figure 7:
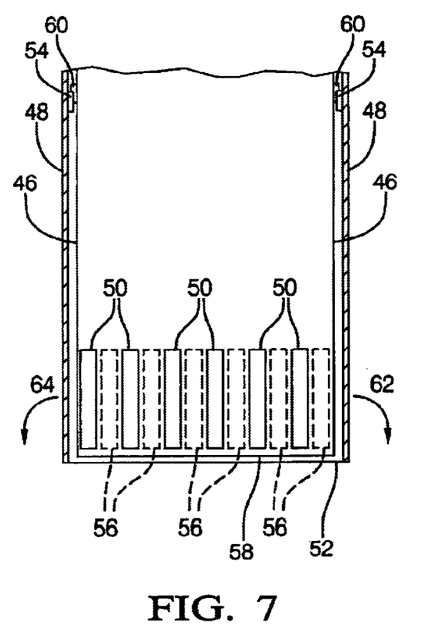
FIG. 7 is an enlarged partial cross-sectional view of the variable flow regulator of FIG. 6 at a first position.
Figure 8:
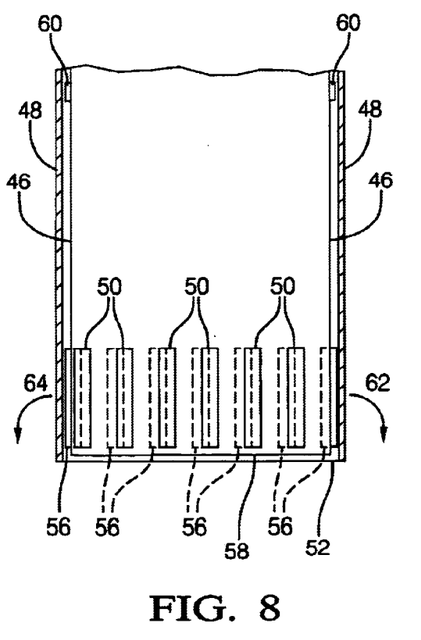
FIG. 8 is an enlarged partial cross-sectional view of the variable flow regulator of FIG. 6 rotated clockwise to a second position.
Figure 9:
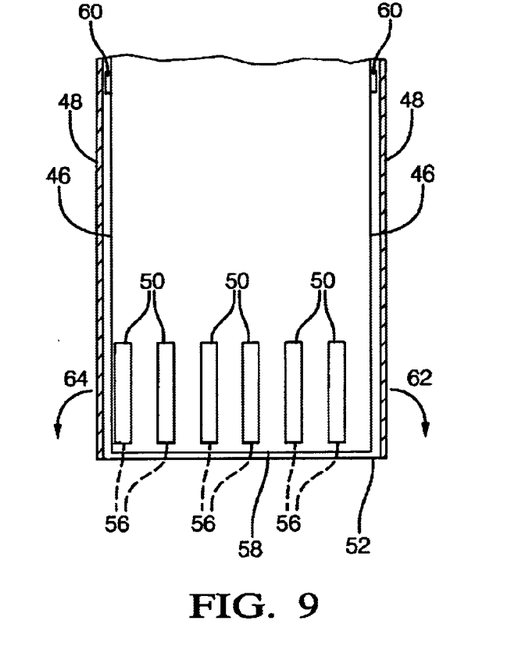
FIG. 9 is an enlarged partial cross-sectional view of the variable flow regulator of FIG. 6 rotated clockwise to a third position.

As the gas treatment device 10 warms and light-off is achieved, the movable exhaust pipe 36 is gradually retracted in a linear motion to a second position B, located anywhere along the path followed by the movable exhaust pipe 36 until reaching a resting position, such as, e.g., resting position C (See FIGS. 3–5). At resting position C, the outlet 37 of the movable exhaust pipe 36 substantially aligns with an outlet 35 of the second stationary exhaust pipe 34. The maldistribution and back pressure gradually decrease without detrimentally impacting the engine's performance, i.e., a decrease in horsepower or fuel efficiency. The variable flow regulator's movement is controlled by the engine control module. The engine control module controls the variable flow regulator's movement, and can determine when to adjust the movable exhaust pipe 36 in at least one of the two ways.

First, the engine control module can measure the manifold intake pressure to determine the engine load, while also monitoring the amount of time elapsed from starting the engine. The engine control module can calculate the conversion exotherm, or heat generated by the gas treatment device, and the back pressure in the combustion chamber based upon the aforementioned measurements. As the conversion exotherm increases, the entire exhaust system warms up and achieves thermal inertia, which overcomes the thermal mass of the system, or the overall temperature the exhaust system must reach to function efficiently. At this point, the gas treatment device achieves light-off, which is electronically sensed by the engine control module.

Second, the engine control module can monitor the oxygen content of the exhaust gas stream as it passes through the gas treatment device. Oxygen sensors can be mounted before and after the gas treatment device. As the exhaust gas stream flows through the gas treatment device, the first oxygen sensor measures the oxygen content prior to being catalytically treated. After passing through the gas treatment device, the oxygen content of the exhaust gas is measured a second time. The engine control module compares the measurements and determines whether the gas treatment device achieved light-off. Once the engine control module electronically senses that light-off has occurred, the engine control module adjusts the movable exhaust pipe by gradually retracting the pipe from position A to position B (See FIGS. 3–4).

As the gas treatment device achieves light-off, pressure builds in the engine combustion chamber. The gradual retraction of the movable exhaust pipe 36 from position A to position B, however, causes the pressure in the engine combustion chamber to gradually reduce. At the same time the exhaust gas stream flow becomes less restricted, which decreases and improves the flow maldistribution. The engine control module can monitor the pressure drop while continuing to electronically adjust the movable exhaust pipe from position B to position C (See FIGS. 4–5). Eventually, the engine control module and variable flow regulator will lower the pressure to a steady state operating level without experiencing a loss in horsepower or fuel efficiency.

The variable flow regulator can be extended and retracted using a mechanical or electrical actuation mechanism (not shown), remotely or mechanically operated, such as the type disclosed in U.S. Pat. No. 6,101,889 to Laskey, and incorporated herein by reference, and other devices designed to actuate or impart movement to a component in a linear direction. Laskey discloses a ball screw and nut linear actuator assembly. The ball screw and nut linear actuator has a motor and a ball nut and screw assembly in side-by-side disposition. A plurality of gearing connects with the motor shaft to drive the screw. A housing for the gearing and ball nut and screw assembly includes an elongate housing tube within which the screw assembly is housed. The nut incorporates an extension sleeve assembly for extending movement out of the housing tube, which anchors the screw against axial movement while journaling it for rotation. A pin and axial track connection between the extension sleeve assembly and the housing tube guides the extension sleeve assembly in axial movement and prevents relative rotation of the housing tube and sleeve assembly. The ball screw and nut linear actuator assembly can be mounted within the first exhaust pipe 32, situated behind the third exhaust pipe 36, and between the first exhaust pipe 32 and second exhaust pipe 34. Alternatively, the actuator assembly can be encased in a housing and mounted as described, or mounted externally to the first exhaust pipe 32 in a sealed housing assembly to prevent leakage of exhaust gas from the exhaust system. The engine control module signals the mechanical actuation mechanism to extend and retract the third exhaust pipe 36, as the engine control module senses the gas treatment device approaching and achieving light-off.

The flow maldistribution and pressure of the exhaust gas stream can also be controlled in a variably uniform manner using another exemplary embodiment of a variable flow regulator configuration. Referring now to FIGS. 6–9, another exemplary embodiment of the gas treatment device 42 connected to a variable flow regulator assembly is depicted. The variable flow regulator assembly comprises a first stationary exhaust pipe 44, a second stationary exhaust pipe 46 concentrically disposed within the first stationary exhaust pipe 44, and a movable exhaust pipe 48 concentrically disposed between the first and second stationary exhaust pipes. The second stationary exhaust pipe 46 includes a plurality of slots 50 concentrically and circumferentially located about an outlet 52 of second stationary exhaust pipe 46. One or more interference tabs 54 are concentrically and circumferentially fitted about the exterior surface of the second pipe 46. The movable exhaust pipe 48 also includes a plurality of slots 56 concentrically and circumferentially located about an outlet 58. In addition one or more interference tabs 60 are also concentrically and circumferentially fitted about the interior surface of the movable exhaust pipe 48. The interference tabs 54, 60 preferably have the same features, and variations, as the aforementioned interference tabs 38, 40 of the previous exemplary embodiment. Interference tabs 54, 60 preferably engage one another to restrict the rotational movement of the movable exhaust pipe 48 about the second stationary exhaust pipe 46. The movable exhaust pipe 48 rotates about the second stationary exhaust pipe 46 as an exhaust gas stream flows through the second stationary exhaust pipe 46 and into the gas treatment device 42.

The rotational movement of this exemplary embodiment of the variable flow regulator is also controlled by the engine control module. The engine control module can determine whether to electronically adjust the variable flow regulator based upon the aforementioned methods discussed in the previous embodiment. When the engine control module determines that the gas treatment device has achieved light-off, the engine control module electronically adjusts the movable exhaust pipe 48 by gradually rotating it. The movable exhaust pipe 48 is preferably situated at position A under start up conditions. At position A the slots 50 and 56 are preferably restricted or closed, and the interference tabs 54, 60 are engaged (See FIG. 7). Once light-off is achieved, the movable exhaust pipe 48 can gradually rotate in a clockwise direction of arrow 62 or counter-clockwise direction of arrow 64 to a position B (See FIG. 8). Position B can be any position where the slots 50 and 56 begin to overlap and create several additional outlets for the exhaust gas stream to flow through. Meanwhile, the engine control module continuously monitors the pressure in the engine combustion chamber and gradually rotates the movable exhaust pipe 48 from position B to position C (See FIGS. 8–9). At position C the slots overlap each other and effectively create an outlet located approximately several inches before the original outlet of both the second stationary and movable exhaust pipes 46 and 48 (See FIG. 9). The thermal mass of the exhaust system achieves the operating temperature such that the catalytic reaction efficiently catalyzes the exhaust stream and lowers the flow maldistribution.

At that point, both sets of interference tabs 54, 60 engage each other to restrict the rotational movement of the movable exhaust pipe 48. Again, the engine control module will electronically adjust the movable exhaust pipe 48 to position C so that the pressure in the engine combustion chamber achieves a steady state operating level without experiencing a loss in horsepower or fuel efficiency. The engine control module can then adjust and return the movable exhaust pipe 48 to position A when the vehicle shuts off.

The variable flow regulator can be rotated clockwise and counter-clockwise using a mechanical, electrical, or electromagnetic actuation mechanism (not shown), remotely or mechanically operated, that can impart intermittent or full rotational movement in either direction. Such mechanical, electrical or electromagnetic mechanisms can comprise a ball screw apparatus, which rather than translating the rotational movement into linear actuation, that is modified to replace the typical axle or screw with a linkage connected to the third exhaust pipe of the variable flow regulator assembly.

Another mechanical, electrical, or electromagnetic mechanism can comprise configuring the exterior of the third exhaust pipe with a concentrically disposed rotatable groove or plurality of grooves able to receive at least one ball bearing. A second concentrically disposed rotatable groove or plurality of grooves able to receive at least one ball bearing is placed on the interior of the first exhaust pipe, and parallel to the groove on the third exhaust pipe. The groove of the first exhaust pipe can be mechanically, electrically, or electromagnetically actuated so that it rotates about the interior of the first exhaust pipe in either a clockwise or counterclockwise motion. The clockwise or counterclockwise motion is then imparted to the ball bearing(s). The ball bearing(s) in turn impart a counter directional force to the third exhaust pipe through the groove, such that the third exhaust pipe rotates in a counterclockwise direction when acted upon by a ball bearing moving in a clockwise direction, and likewise, rotates in a clockwise direction when acted upon by a ball bearing moving in a counterclockwise direction.

Yet another mechanical or electrical mechanism can comprise a modified multi-functional apparatus employing an intermittent motor mechanism such as the apparatus disclosed in WO/96/33891, U.S. Pat. No. 6,075,298, and U.S. Pat. No. 6,107,759. Multi-functional apparatus for vehicles typically operate several functions, such as a window wiper mechanism, front and rear window locks, and lift gate lock mechanisms, using intermittent rotational motion to move, for example, a window wiper side to side across a windshield. That same type of intermittent motor mechanism can be mounted within the exemplary variable flow regulator, and modified for remote actuation of the variable flow regulator alone, according to signals received from the engine control module.

For example, the output pinion of the rotatable member in FIG. 1a of U.S. Pat. No. 6,107,759, incorporated herein by reference, can be implemented with the third exhaust pipe, such that the third exhaust pipe can be equipped with a worm gear groove or plurality of worm gear grooves concentrically disposed about a portion of its exterior, and such grooves are placed in physical contact and communication with an output pinion for interaction with the rotatable member. As the rotatable member imparts a rotational movement to the output pinion, the third exhaust pipe rotates about the first exhaust pipe. The variable flow regulator can then operate independently to quickly achieve a quick catalyst light-off without the drawbacks associated with a strictly multi-functional motor mechanism, i.e., typically, when one function, such as a door lock, is impaired, then the remaining functions become impaired as well. The intermittent motor mechanism can be mounted within the first exhaust pipe 44, situated between the first exhaust pipe 44 and third exhaust pipe 48, and impart a rotational movement to the third exhaust pipe 48 in either a clockwise or counterclockwise direction about the first exhaust pipe 44, according to the engine control module. Alternatively, the actuator assembly can be encased in a housing and mounted as described, or mounted externally to the first exhaust pipe 32 in a sealed housing assembly to prevent leakage of exhaust gas from the exhaust system.

Figure 10:
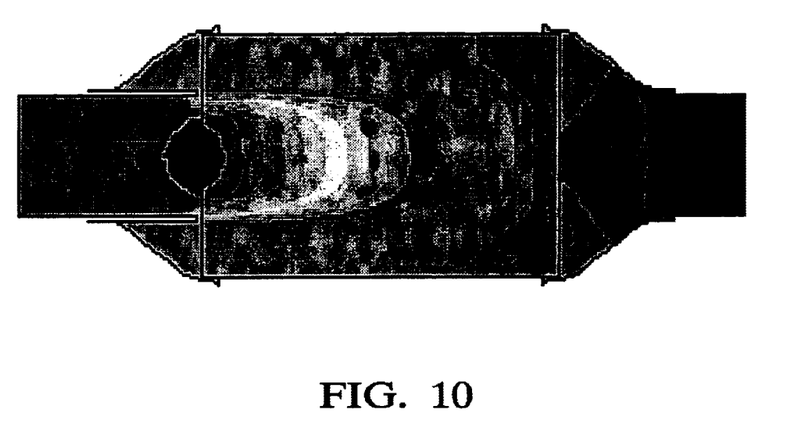
FIG. 10 is a cross-sectional view of a conventional circular gas treatment device with an exemplary variable flow regulator assembly depicting the contours of static pressure of an exhaust gas flow traveling through the variable flow regulator positioned as shown in FIGS. 3 and 7.
Figure 11:
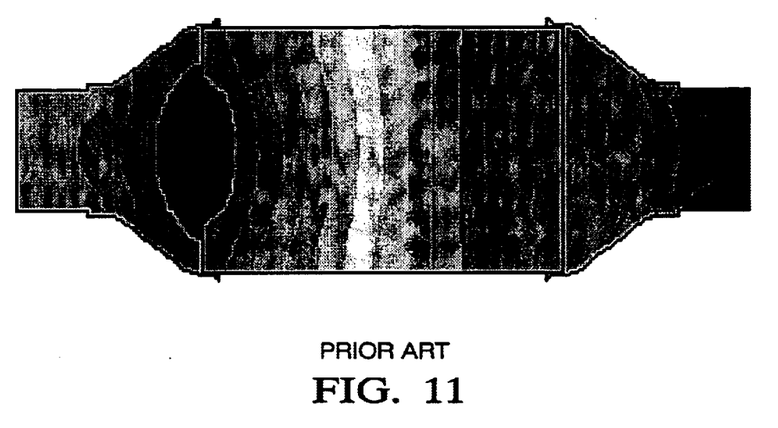
FIG. 11 is a cross-sectional view of a conventional circular gas treatment device without an exemplary variable flow regulator depicting the contours of static pressure of an exhaust gas flow traveling through the gas treatment device.

The exemplary variable flow regulator, when coupled to either a conventional circular or oval shaped gas treatment device, enhances the performance of the gas treatment device by increasing the pressure at which the exhaust gas travels through the converter, as well as the flow maldistribution, and thus quickening the light-off of the gas treatment device. As shown in FIG. 10, the exhaust gas flow is concentrated through the center of the substrate at a higher pressure, as illustrated by the pressure waves moving from left to right along the x axis, than a gas treatment device operating without a variable flow regulator assembly. As a result, the substrate's catalytic reaction immediately occurs, thus causing the temperature to increase quickly, and accelerating the light-off. In contrast, FIG. 11 illustrates a conventional gas treatment device operating without a variable flow regulator assembly. The exhaust gas passes through the substrate at a lower pressure, which does not subsequently accelerate the catalytic reaction or increase the temperature of the substrate. In an experimental simulation, both variable flow regulator embodiments directed the exhaust gas flow into a circular gas treatment device at a pressure gradient $\Delta P$ of about 6080 pascals (Pa), in comparison to the conventional circular gas treatment device of FIG. 11, which only maintained an exhaust gas flow pressure gradient $\Delta P$ of about 2816 pascals.

Figure 12:
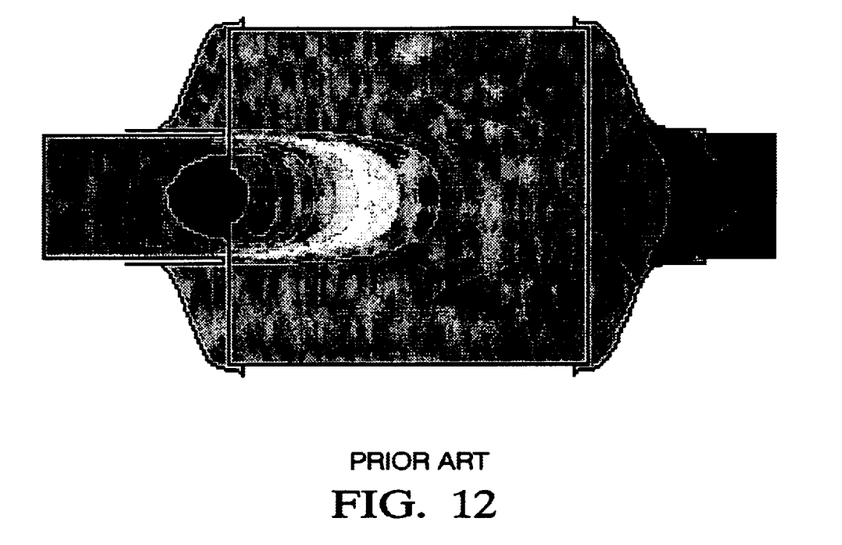
FIG. 12 is a cross-sectional view of a conventional oval shaped gas treatment device with an exemplary variable flow regulator assembly depicting the contours of static pressure of an exhaust gas flow traveling through the variable flow regulator positioned as shown in FIGS. 3 and 7.
Figure 13:
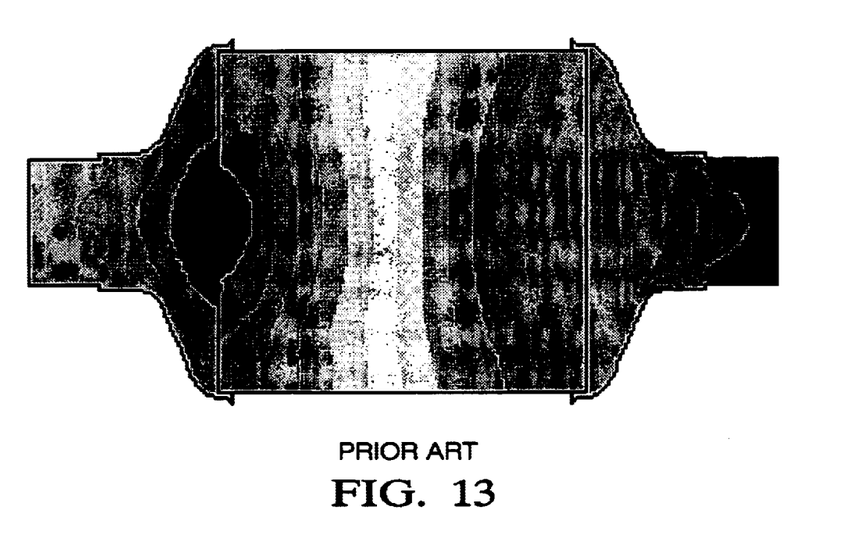
FIG. 13 is a cross-sectional view of a conventional oval shaped gas treatment device without an exemplary variable flow regular depicting the contours of static pressure of an exhaust gas flow traveling through the gas treatment device.

Likewise, in a similar experimental simulation employing an oval shaped gas treatment device in FIGS. 12 and 13, the variable flow regulator directed the exhaust gas flow into the gas treatment device at a pressure gradient $\Delta P$ of about 6029 pascals, in comparison to the conventional oval shaped gas treatment device of FIG. 13, which only maintained an exhaust gas flow pressure gradient $\Delta P$ of about 2919 pascals. As demonstrated by the pressure waves in FIG. 12, the variable flow regulator concentrated the flow through the substrate, which accelerated the catalyst reaction occurring within and quickened the light-off. In contrast, the conventional gas treatment device could not concentrate the exhaust gas stream through the center of the substrate and generate the same benefits as the variable flow regulator, and the pressure gradients reflect this difference.

Figure 14:
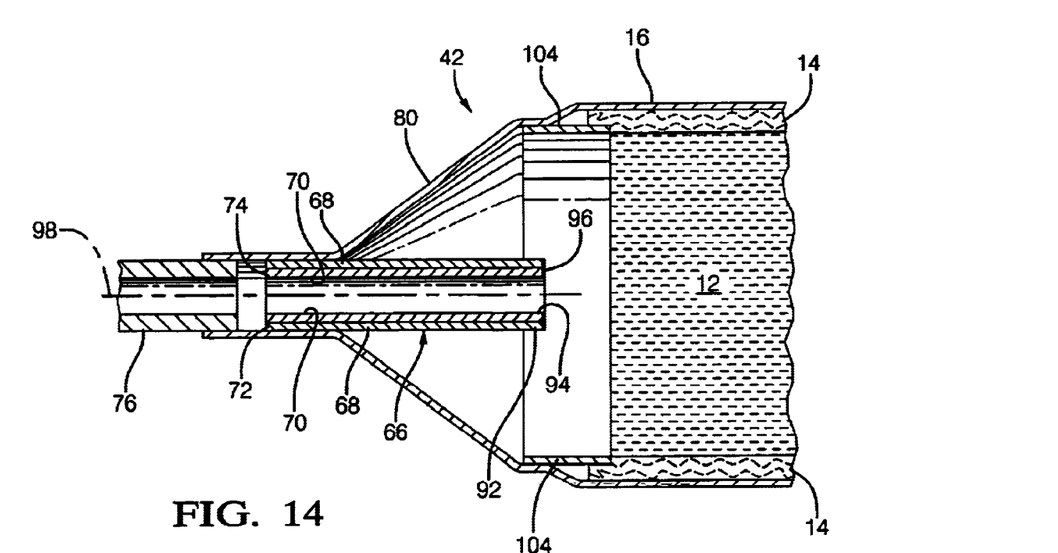
FIG. 14 is an enlarged partial cross-sectional view of the gas treatment device of FIG. 1 with an alternative exemplary embodiment of a variable flow regulator assembly shown in a first position.

In yet another exemplary embodiment, the variable flow regulator can employ thermally sensitive material rather than including a mechanical or electrical apparatus, or means, to alter the flow of the exhaust gas stream into the gas treatment device. The variable flow regulator, disposed within the gas treatment device as illustrated in FIG. 14, initially directs and concentrates the exhaust gas stream into the center of the substrate to create a high flow maldistribution. As the gas treatment device achieves light off and the temperature of the exhaust system increases, the variable flow regulator can transform structurally, e.g., expand or flare, to lessen the flow maldistribution. When the exhaust system is deactivated and the temperature decreases (e.g., to start up condition temperatures), the variable flow regulator reassumes its original form.

Referring now to FIGS. 14–19, a variable flow regulator 66 can comprise two or more conduit portions comprising a plurality of concentrically aligned segments, or one or more portions of conduit material. For example, a first portion 68 can be disposed parallel to and in physical contact with a second portion 70, such that the first portion 68 is fixedly attached to the second portion 70, and the second portion 70 is disposed between the first portion 68 and the substrate 12. In addition, at least a section of the first portion 68 can be concentrically disposed around at least a section of the second portion 70. The first and second portions 68, 70 further operably and fluidly communicate with a fluid inlet, such as an exhaust system component (e.g., exhaust pipe 76, end cone 80, and the like), to enable flow from the exhaust pipe 76 to flow through the variable flow regulator 66.

The first and second portions 68, 70 can be fixedly attached to each other and with the end cone 80 by disposing the ends 72, 74, individually and concentrically within the end cone 80, and optionally abutting the exhaust pipe 76, using a screw, bracket, pin, punch, crimp, weld, adhesive, bonding agent, joint (e.g., lap, butt, tee, dovetail, interlocking, overlap, and the like), as well as combinations comprising at least one of the foregoing methods, and the like, and preferably using a weld. In addition, the first portion 68 can be fixedly attached to the second portion 70 at a location opposite the substrate 12 in the gas treatment device. The location is selected from the group consisting of a first portion end, a second portion end, proximate said first portion end, proximate said conduit portion end, as well as combinations comprising at least one of the foregoing locations, and the like.

In the alternative, the first and second conduit ends 72, 74 can fixedly attach to each other and with the exhaust pipe 76 by disposing the ends 72, 74, individually, concentrically around, or concentrically within the exhaust pipe 76 using a screw, bracket, pin, punch, crimp, weld, adhesive, bonding agent, joint, as well as combinations comprising at least one of the foregoing methods, and the like, and preferably using a weld. For example, both ends 72, 74 can be disposed within the exhaust pipe 76, both ends 72, 74 can be disposed around an end of the exhaust pipe 76, or one of the ends (e.g., 74) can be disposed within the exhaust pipe 76 while the other end 72 is disposed around the exhaust pipe 76.

Figure 19:
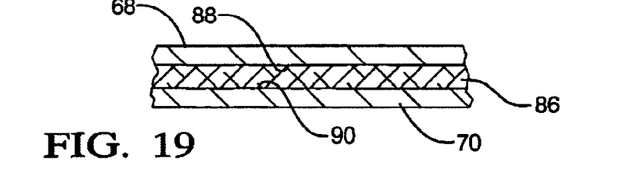
FIG. 19 is an enlarged view of area 19 of FIG. 16 depicting the first and second portions having a bonding agent disposed therebetween.

At least a section of the first portion 68 can be concentrically disposed around at least a section of the second portion 70. More particularly, a bonding agent, an adhesive agent, as well as combinations comprising at least one of the foregoing agents, and the like, is disposed between the first and second portions 68, 70. Referring specifically to FIG. 19, the bonding agent 86 preferably adheres to at least a section of an interior surface 88 of the first portion 68 and at least a portion of an exterior surface 90 of the second portions 70. The bonding agent 86 interacts with the first and second portions 68, 70 to facilitate optimal bending when the second portion 70 expands.

In the alternative, the first and second portions 68, 70 can be attached at their second ends 92, 94, respectively, using a screw, bracket, pin, punch, crimp, weld, adhesive, bonding agent, joint, as well as combinations comprising at least one of the foregoing methods, and the like, and preferably using a weld 96. The weld 96 is preferably disposed at the very tip of each end 92, 94. When the first and second portions 68, 70 expand and bend, and the second portion 70 expands farther than the first portion 68, the welded ends 92, 94 will force the first portion 68 to bend with the second portion 70.

Two or more conduit portions comprising first and second portions 68, 70 are preferably concentrically disposed about the interior shape of the exhaust system component. Alternatively, the exhaust system component can be disposed around at least a portion of the variable flow regulator assembly 66. The first and second portions 68, 70 preferably align with an axis 98 disposed through the center of the exhaust system component and optionally parallel to the first and second portions 68, 70. Although two or more first and second portions 68, 70 are shown concentrically disposed within the exhaust system component, two or more first and second portions 68, 70 can be aligned to conform to the shape of the inlet of the exhaust system component (See FIGS. 14 and 17). Such shapes can comprise circular, non-circular (e.g., oval, elliptical, and the like), multi-sided (e.g., triangular, rectangular, pentagonal, hexagonal, heptagonal, octagonal, and the like), as well as combinations comprising at least one of the foregoing shapes. Furthermore, although two or more first and second portions 68, 70 are aligned to form a cylindrical shape within the interior of the exhaust system component, the first and second portions 68, 70 can comprise any shape and size capable of fluidly communicating with the exhaust gas flow (e.g., from the exhaust pipe 76) and the substrate 12 to attain the desired flow maldistribution. Preferably though, the two or more first and second portions 68, 70 have a generally conical and/or cylindrical shape during cool startup conditions.

The edges 100, 102 along the length of each first and second portions 68, 70 can make contact or overlap with one another, and preferably at least contact one another sufficient to direct the exhaust flow into the substrate 12.

The length of the first and second portions 68, 70 can be equivalent or different, such that the second portion length may be less than, greater than or equal to the first portion length. The preferred relative lengths of the first and second portions depend upon the particular materials and/or particular application. Preferably, the variable flow regulator 66 spans up to about 99% or so of the distance between a fluid inlet opening and the substrate, with up to about 95% preferred, and up to about 90% more preferred. It is further preferred that the variable flow regulator 66 have a sufficient length to span at least about 70% of the distance between the fluid inlet opening and the substrate, with a distance of greater than about 80% preferred, and a distance of about 85% especially preferred. For example, if the distance between the outlet of the exhaust pipe 76 leading into the gas treatment device, or the inlet of an end cone 80 in operable and fluid communication with the gas treatment device, and the substrate 12 is about 50 millimeters ("mm"), the variable flow regulator can have a length of about 45 mm to about 49 mm, with about 5% to about 15% of the length of the variable flow regulator 66 is fixedly attached to the fluid inlet and/or exhaust system component inlet at an end opposite the substrate 12.

The exhaust system component can comprise an exhaust pipe 76, end cone 80, end plate, coupling apparatus, pipe(s), exhaust manifold cover, exhaust manifold apparatus, as well as combinations comprising at least one of the foregoing exhaust system components, and the like, with fluid communication with either an end cone 80 or an end plate (not shown) preferred. The exhaust system component and variable flow regulator 66 can be secured to a gas treatment device, or other treatment device, and preferably sealingly secured to prevent exhaust gas from leaking. The variable flow regulator 66 is disposed within the gas treatment device such that an opening of the regulator faces, i.e., is in fluid communication with the inlet of the substrate 12, so as to enable exhaust flow maldistribution through the substrate 12.

The first and second portions 68, 70 of the variable flow regulator 66 comprise two or more materials that possess different coefficients of thermal expansion. The first portion 68 and second portion 70 materials are selected based on several factors such as composition, flexibility, malleability, coefficient of thermal expansion ("CTE"), and ability to withstand exposure to exhaust gas components such as carbon dioxide, carbon monoxide, nitrogen oxides, sulfur and sulfur oxides, hydrocarbons, and the like. The first and second portions 68, 70 can, individually, comprise a ferritic material such as stainless steel (e.g., the 400-Series, SS-409, SS-439 and SS-441) or an austenitic stainless steel. The austenitic stainless steels differ slightly in composition from stainless steels and possess a CTE that is greater than the stainless steel CTE. Since the CTE value of the second conduit portion 70 determines the extent to which the diameter of the variable flow regulator 66 expands and flares within the exhaust system component, the second conduit portion 70 preferably possesses a CTE greater than the first conduit portion CTE.

Figure 18:
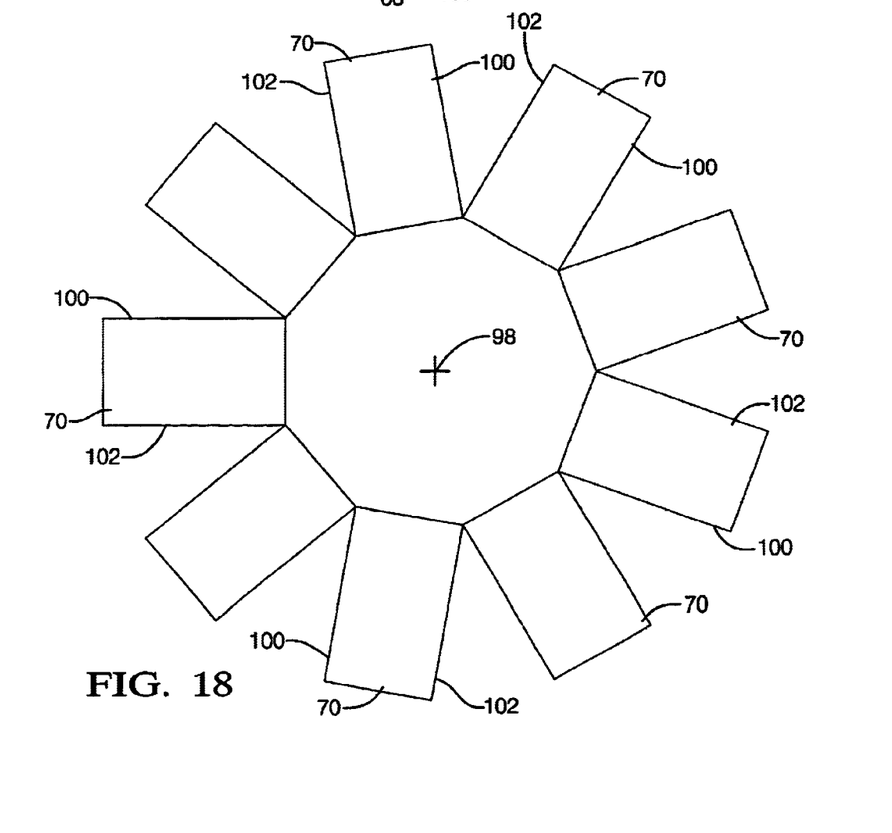
FIG. 18 is an end view of the conduit portions of FIG. 17 shown in a second position.

Due to the differences in CTE values between the first and second portions 68, 70, the variable flow regulator 66 can undergo a structural change, e.g., a change in geometry, when the temperature of the exhaust system changes (See FIG. 18). For example, and for purposes of illustration, a cylindrically shaped regulator mounted in a gas treatment device can maintain a cylindrical form under start up conditions, such as at an ambient temperature of about 25° C. (298° Kelvin). A gas introduced into the gas treatment system passes through the variable flow regulator and into the gas treatment device. As the gas treatment device achieves light off, the temperature of the gas treatment system increases. In response to this gas treatment system temperature increases, one or more conduit portions expand and deform to structurally transform the variable flow regulator 66 from a substantially cylindrical geometry to a substantially conical geometry with the conduit portions diverging away from the substrate 12 (See FIGS. 16 and 18).

For example, the second portion 70 can expand to bend and increase in length. The second portion 70 preferably bends outwardly and diverges away from the substrate 12 as the conduit portion material expands. As the second portion 70 expands and bends, it slides against the first portion 68 thus forcing the first portion 68 to also bend and conform to the new shape. The resulting expansion causes the opening of the variable flow regulator 66 to flare outwardly. The internal diameter of the variable flow regulator end disposed adjacent the substrate 12 can increase, thus creating spaces between the plurality of segments which form the conduit portions (See FIG. 18). In some cases, the expansion can cause the regulator to conform to the interior shape of the exhaust system component in FIG. 16. The expansion of the variable flow regulator assembly 66 also changes the flow distribution of the gas to the substrate such that the flow maldistribution of the exhaust gas flow increases as at least an end of the conduit portions disposed adjacent to the substrate 12 expand.

Figure 15:
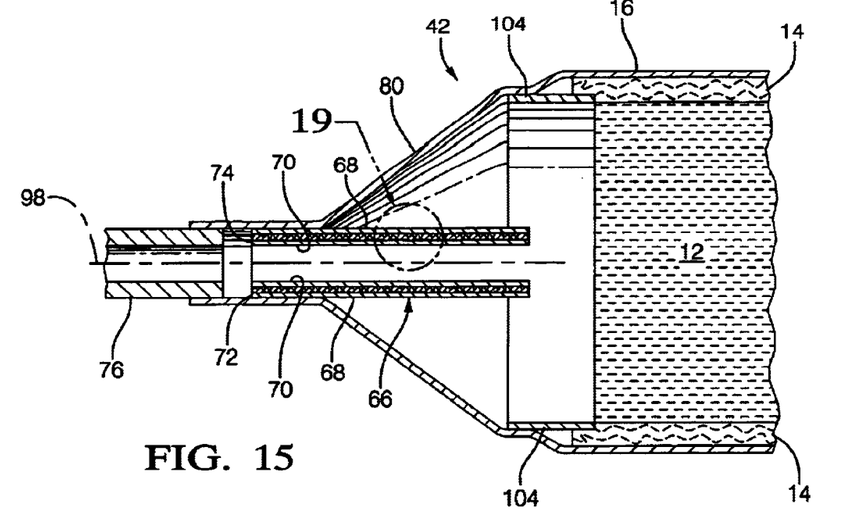
FIG. 15 is an enlarged partial cross-sectional view of an alternative exemplary embodiment of the variable flow regulator assembly of FIG. 14.
Figure 16:
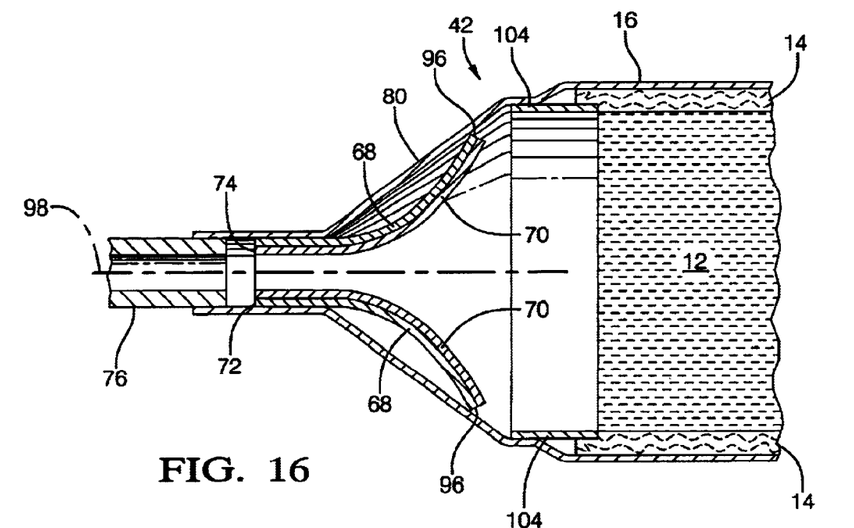
FIG. 16 is a cross-sectional view of the variable flow regulator of FIG. 14 shown in a second position.
Figure 17:
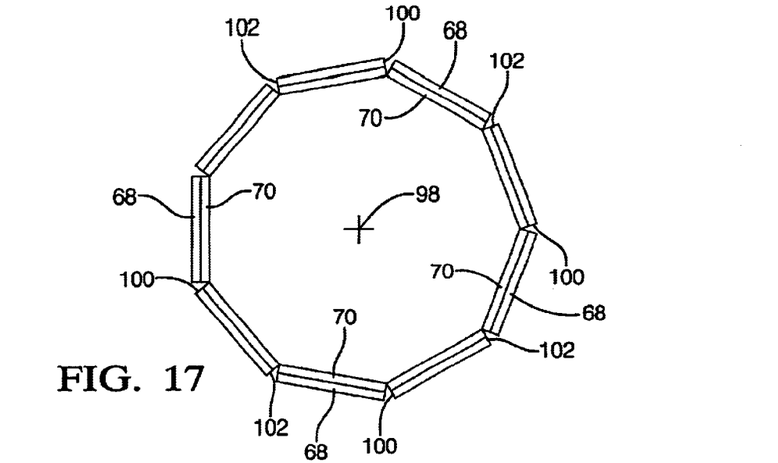
FIG. 17 is an end view of the variable flow regulator of FIG. 14 showing the conduit portions longitudinally aligned along the axis of the exhaust system component.

In an experimental computer simulation of the variable flow regulator 66, a variable flow regulator assembly was placed in operable communication with an end cone. The variable flow regulator measured 30 millimeters in diameter at 300° K., and comprised first portions representing an SS-400 series stainless steel, which possesses a coefficient of thermal expansion of $9 \times 10^{-6}$ 1/degree Kelvin ($K^{-1}$) bonded to second portions representing an austenitic stainless steel, which possesses a coefficient of thermal expansion of $18 \times 10^{-6}$ $K^{-1}$. Two or more bonded first and second portions were disposed within an exhaust system component as illustrated in FIG. 15. In the simulation, the first and second portions possessed an equivalent length at 300° K. The end cone measured 50 millimeters in length. When the simulation environment was heated to 1,200° K., the second conduit expanded and bended or flared outwardly. Due to the difference in coefficient of thermal expansion between the two materials, and the differential expansion rate between the first portion and second portion, the first portion expanded less than the second portion, and bended to conform to the shape being assumed by the second portion. As a result, the simulation determined that the variable flow regulator's radius of bending at 1,200° K. measured 65 millimeters.

In another computer simulation, the variable flow regulator assembly first was disposed within an exhaust system component as illustrated in FIG. 14. The conduit portions comprised the same materials as in the first computer simulation. The first and second portions were welded together at their ends opposite the exhaust pipe inlet. The simulation environment conditions of the first simulation were repeated. The first portion expanded less than the second portion, yet bended to conform to the shape being assumed by the second portion. The first portion expanded less than the second conduit portion due to the differential expansion rate, and different CTE values, between the first and second portion materials. The simulation determined that the variable flow regulator's radius of bending at 1,200° K. measured 12 millimeters when employing a weld disposed at the tip of the first and second portions.

The two simulations confirmed that (1) the variable flow regulator structurally transforms in accordance with the larger CTE value of the second conduit; and (2) a variable flow regulator can expand to increase its diameter by about 200% or more, thereby enabling the use of the same size component in numerous exhaust system components such as end plate, end cone, exhaust pipe, coupling apparatus, a flexible coupling apparatus, connecting pipe, inlet pipe, exhaust manifold cover, exhaust manifold assembly, as well as combinations comprising at least one of the foregoing components, and the like.

The variable flow regulator facilitates a quicker light-off of the substrate using materials possessing different coefficients of thermal expansion. These materials structurally transform to increase the variable flow regulator's outlet, and thus also the flow maldistribution of the exhaust gas stream into the gas treatment device. This variable flow regulator is very cost effective since it does not require additional mechanical or electrical assemblies. In addition, due to its compact size, it can be easily disposed and employed within exhaust system components and gas treatment devices utilizing any substrate shape.

The variable flow regulator reduces and/or eliminates the need to create a richer air/fuel mixture during the initial warming phase to achieve a quicker gas treatment device light-off time. A richer air/fuel mixture can be used to create a greater exothermic oxidation of exhaust elements within the combustion chamber of the vehicle's engine. The exhaust gas stream can increase in temperature and, likewise, cause the gas treatment device to rapidly increase in temperature and facilitate a quicker light-off time. The great disadvantage to enriching the air/fuel mixture is that the vehicle's engine performance is compromised. The conventional arrangement of exhaust engine components cannot be effectively tuned for optimum engine power and engine torque. With regard to the tuning of an engine, the design of the engine outlets should always be considered, so as to provide an optimum volumetric efficiency of the engine. The geometry of conventional exhaust manifolds do not allow any such tuning, which is essential if the engine's performance is to be optimized. The variable flow regulator can optimize the gas treatment device's light-off without compromising both fuel efficiency and engine performance by directing and concentrating the exhaust gas flow through the center of the substrate.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gas treatment device, comprising:

a substrate;

a shell concentrically disposed around said substrate;

a mat support material disposed between said substrate and said shell; and a variable flow regulator assembly in fluid communication with said substrate, said variable flow regulator assembly comprising a second portion having a coefficient of thermal expansion greater than a first portion coefficient of thermal expansion, and wherein said second portion is disposed between a first portion and said substrate.

2. The gas treatment device recited in claim 1, wherein at least a section of said first portion is concentrically disposed around at least a section of said second portion.

3. The gas treatment device recited in claim 2, wherein said first portion is fixedly attached to said second portion with an attachment selected from the group consisting of a screw, bracket, pin, punch, crimp, weld, adhesive, bonding agent, joint, and combinations comprising at least one of the foregoing attachments.

4. The gas treatment device recited in claim 3, wherein said attachment is disposed at a location opposite said substrate, wherein said location is selected from the group consisting of a first portion end, a second portion end, proximate said first portion end, proximate said second portion end, and a combination thereof.

5. The gas treatment device recited in claim 4, wherein said bonding agent adheres to at least a section of an interior surface of said first portion and at least a section of an exterior surface of said second portion.

6. The gas treatment device recited in claim 1, further comprising an exhaust system component disposed in operable communication with said shell, wherein said exhaust system component is selected from the group consisting of an end cone, end plate, pipe, coupling apparatus, exhaust manifold cover, exhaust manifold apparatus, and combinations comprising at least one of the foregoing exhaust system components.

7. The gas treatment device recited in claim 6, wherein said said exhaust system component is disposed around at least a section of said variable flow regulator assembly.

8. The gas treatment device recited in claim 7, wherein at least a section of said first portion is concentrically disposed around at least a section of said second portion.

9. The gas treatment device recited in claim 6, wherein said variable flow regulator assembly comprises a length sufficient to span up to about 99% of a distance between said exhaust system component and said substrate.

10. The gas treatment device recited in claim 9, wherein said length is greater than or equal to about 85% of said distance.

11. The gas treatment device recited in claim 6, wherein about 5% to about 15% of a length of said variable flow regulator assembly is fixedly attached to an exhaust system component inlet at an end of said variable flow regulator assembly opposite said substrate.

12. The gas treatment device recited in claim 1, wherein said first portion and said second portion comprise equal lengths.

13. The gas treatment device recited in claim 1, wherein said first portion and said second portion comprise different lengths.

14. The gas treatment device recited in claim 1, wherein said substrate further comprises a catalyst.

15. The gas treatment device recited in claim 1, wherein said gas treatment device is selected from the group consisting of catalytic converters, evaporative emissions treatment devices, hydrocarbon scrubbing devices, photocatalytic treatment device, diesel particulate traps, and non-thermal plasma reactors.

16. The gas treatment device recited in claim 1, wherein at least one of said first portion and said second portion further comprise a plurality of concentrically aligned segments.

17. A method for using a gas treatment device, comprising:
introducing a gas into said gas treatment device comprising a shell concentrically disposed around a substrate, a mat support material disposed between said substrate and said shell, and a variable flow regulator assembly in fluid communication with said substrate, said variable flow regulator assembly comprising a second portion having a coefficient of thermal expansion greater than a first portion coefficient of thermal expansion, and wherein said second portion is disposed between a first portion and said substrate;
passing said gas through said variable flow regulator assembly; and
changing a flow distribution of said gas to said substrate.

18. The method recited in claim 17, further comprising increasing an internal diameter of at least an end of said variable flow regulator assembly disposed adjacent said substrate.

19. The method recited in claim 18, wherein said increasing said internal diameter creates spaces between a plurality of segments which form said conduit portions.

20. The method recited in claim 17, wherein said changing said flow distribution further comprises conforming a shape of said variable flow regulator assembly to an interior shape of an exhaust system component disposed in fluid communication with said shell.

21. The method recited in claim 17, wherein said changing said flow distribution further comprises changing a shape of said variable flow regulator assembly from a substantially cylindrical shape to a substantially conical shape having one or more of said conduit portions diverging away from said substrate of the gas treatment device.

22. A gas treatment device, comprising:
means for containing a substrate, with a means for supporting said substrate disposed between said substrate and said means for containing;
means for controlling fluid flow distribution to said substrate comprising a variable flow regulator assembly comprising a second portion having a coefficient of thermal expansion greater than a first portion coefficient of thermal expansion, wherein said second portion is disposed between a first portion and said substrate; and
means for connecting said means for containing to a fluid supply, wherein said means for connecting is in operable communication with said means for controlling fluid flow distribution.

23. The gas treatment device recited in claim 22, wherein said first portion is fixedly attached to said second portion at a location opposite said substrate, wherein said attachment is selected from the group consisting of a screw, bracket, pin, punch, crimp, weld, adhesive, bonding agent, joint, and combinations comprising at least one of the foregoing attachments, and wherein said location is selected from the group consisting of a first portion end, a second portion end, proximate said first portion end, proximate said second portion end, and a combination thereof.

24. The gas treatment device recited in claim 22, wherein said substrate further comprises a catalyst.

25. The gas treatment device recited in claim 22, wherein said gas treatment device is selected from the group consisting of catalytic converters, evaporative emissions treatment devices, hydrocarbon scrubbing devices, photocatalytic treatment device, diesel particulate traps, non-thermal plasma reactors, and combinations comprising at least one of the foregoing devices.

26. The gas treatment device recited in claim 22, wherein said variable regulator flow assembly further comprises a means for increasing an internal diameter of at least an end of said variable regulator flow assembly.

27. The gas treatment device recited in claim 26, wherein said means for increasing an internal diameter forms a space between a plurality of segments defining said second portion.

28. A catalytic converter, comprising:
a shell concentrically disposed around a substrate comprising a catalyst, a mat support material disposed between said substrate and said shell;
a variable flow regulator assembly placed in fluid communication with said substrate, said variable flow regulator assembly comprising a second portion having a coefficient of thermal expansion greater than a first portion coefficient of thermal expansion, wherein said second portion is disposed between a first portion and said substrate, wherein a portion of at least said first portion is disposed around and fixedly attached to at least a section of said second portion; and
an end cone disposed concentrically around said variable flow regulator assembly in operable communication with said shell, and in fluid communication with said variable flow regulator assembly.

* * * * *